(12) United States Patent
Jahan et al.

(10) Patent No.: US 7,991,092 B2
(45) Date of Patent: Aug. 2, 2011

(54) METHOD FOR RECEIVING A MULTICARRIER SIGNAL USING AT LEAST TWO ESTIMATES OF A PROPAGATION CHANNEL AND CORRESPONDING RECEPTION DEVICE

(75) Inventors: Bruno Jahan, Tinteniac (FR); Marc Lanoiselee, Rennes (FR); Pierrick Louin, Rennes (FR)

(73) Assignee: TDF, Paris Cedex (FR)

( * ) Notice: Subject to any disclaimer, the term of this patent is extended or adjusted under 35 U.S.C. 154(b) by 911 days.

(21) Appl. No.: 11/667,371

(22) PCT Filed: Oct. 24, 2005

(86) PCT No.: PCT/EP2005/055488
§ 371 (c)(1),
(2), (4) Date: Oct. 10, 2007

(87) PCT Pub. No.: WO2006/051036
PCT Pub. Date: May 18, 2006

(65) Prior Publication Data
US 2008/0212727 A1  Sep. 4, 2008

(30) Foreign Application Priority Data
Nov. 9, 2004 (FR) .................................. 04 11950

(51) Int. Cl.
*H04B 1/10* (2006.01)
(52) U.S. Cl. ........................................ 375/350; 375/346

(58) Field of Classification Search .................. 375/350, 375/346
See application file for complete search history.

(56) References Cited

U.S. PATENT DOCUMENTS

| | | | | |
|---|---|---|---|---|
| 6,768,727 | B1 * | 7/2004 | Sourour et al. | 370/335 |
| 2002/0034264 | A1 * | 3/2002 | Vigil | 375/316 |
| 2003/0128656 | A1 * | 7/2003 | Scarpa | 370/203 |
| 2003/0185165 | A1 * | 10/2003 | Ishii et al. | 370/317 |
| 2007/0041456 | A1 * | 2/2007 | Jahan et al. | 375/260 |
| 2008/0130674 | A1 * | 6/2008 | Ahmed-Ouameur et al. | 370/441 |

FOREIGN PATENT DOCUMENTS

| | | |
|---|---|---|
| EP | 0 762 703 A1 | 8/1996 |
| EP | 1 339 196 A1 | 2/2003 |
| EP | 1 414 177 A1 | 9/2003 |

* cited by examiner

*Primary Examiner* — Shuwang Liu
*Assistant Examiner* — Michael R Neff
(74) *Attorney, Agent, or Firm* — David D. Brush; Westman, Champlin & Kelly, P.A.

(57) ABSTRACT

A method is provided for receiving a multicarrier signal including a time-based succession of symbols, each including a plurality of multicarriers bearing data, at least one of said symbols including at least one reference pilot. The method includes the following steps: a first estimation of a propagation channel, in accordance with a first estimating technique taking into account the or said reference pilots; at least one second estimation of said propagation channel, in accordance with a second estimating technique different from said first technique; comparing said first and second estimations, delivering an error signal; detecting at least one interfering signal in said propagation channel, by analyzing said error signal.

19 Claims, 3 Drawing Sheets

METHOD FOR RECEIVING A MULTICARRIER SIGNAL USING AT LEAST TWO ESTIMATES OF A PROPAGATION CHANNEL AND CORRESPONDING RECEPTION DEVICE

CROSS-REFERENCE TO RELATED APPLICATION

This Application is a Section 371 National Stage Application of International Application No. PCT/EP2005/055488, filed Oct. 24, 2005 and published as WO 2006/051036 on May 18, 2006, not in English.

FIELD OF THE DISCLOSURE

The field of the disclosure is that of digital communications, particularly applied in DAB (Digital Audio Broadcasting), DVB-T (Digital Video Broadcasting Terrestrial) or DRM (Digital Radio Mondiale) types of digital radio broadcasting systems, and in telecommunications (ADSL, Hyperlan2, etc.).

In particular but not exclusively, the invention relates to DAB, DVB-T, DVB-H, DRM type receivers that use an OFDM (Orthogonal Frequency Division Multiplex) type demodulation which is more and more used in the above mentioned domains.

More precisely, the disclosure proposes to reduce the influence of co-channel jammers in reception, for signals using for example an OFDM type modulation.

BACKGROUND

1. Reminder About the Principle of OFDM Modulation

OFDM modulation consists of making a distribution in the time-frequency space of symbols with duration Tu (called the useful symbol time) on a plurality of carrier frequencies that are independently modulated for example in QPSK (Quadrature Phase Shift Keying) or QAM (Quadrature Amplitude Modulation), for example with 16, 64, 256, etc. states. The OFDM technique thus breaks the channel into cells along the time axis 11 and the frequency axis 12 as illustrated in FIG. 1. Each carrier is orthogonal to the previous carrier.

The channel with predetermined width 13 is decomposed into a sequence of frequency sub-bands 14 and a sequence of time segments 15 (also called time intervals).

A dedicated carrier is assigned to each time/frequency cell. Therefore, we will distribute the information to be transported over all these carriers, each modulated at low speed, for example by a QPSK or QAM type modulation. An OFDM symbol comprises all information carried by the set of carriers at time t.

This modulation technique is particularly efficient in situations in which multipaths are encountered. Thus, as illustrated on FIG. 2 that presents a set of OFDM symbols 21, the same sequence of symbols reaching a receiver by two different paths is like the same information arriving at two different instants and that is additive. These echoes cause two types of faults:

intra-symbol interference: addition of a symbol with itself with a slight phase shift, inter-symbol interference: addition of a symbol with the next symbol and/or the previous symbol with a slight phase shift.

A "dead" zone called a guard interval 22 is inserted between transmitted symbols, the duration Δ of which is chosen to be sufficiently large compared with spreading of echoes. These precautions will limit inter-symbol interference (as the interference is absorbed by the guard interval). Thus, each OFDM symbol 21 comprises a guard interval 22 and data 23.

On reception, carriers may also have been attenuated (destructive echoes) or amplified (constructive echoes) and/or subject to a phase rotation.

Pilot synchronisation carriers, also called reference pilots (often with an amplitude greater than the useful data carriers), are also inserted to calculate the channel transfer function so that the signal can be equalised before demodulation. The value and position of these reference pilots in time/frequency space are predefined and known to receivers.

FIG. 3 thus presents the OFDM structure in mode A of a set of DRM symbols, illustrating the distribution of reference pilots 31 in the time/frequency space. This structure is described particularly in DRM standard ETSI ES 201 980.

FIG. 4 presents another example of an OFDM structure of a set of DVB-T symbols illustrating the distribution of reference pilots 41 among useful data 42 in the time/frequency space.

The result obtained after interpolation in time and in frequency is a more or less relevant estimation of the channel response, depending on the number of reference pilots and their distribution in the time/frequency domain.

Thus, the reference pilots inserted in the multicarrier signal are used to estimate the propagation channel. The estimation of the propagation channel is used notably to correct received data, also called the data pilots at the receiver (equalisation) and to obtain the pulse response of the propagation channel. The pulse response obtained may then be used to refine the time synchronisation of the receiver(s).

2. Application in AM Bands (DRM)

OFDM modulation is increasingly used in digital broadcasting because it is very well adapted to variations of the radio channel that are related essentially to echoes and the Doppler effect. It was thus selected for digital audio broadcasting in the AM bands (DRM).

To choose the most suitable OFDM structure, engineers start by studying the characteristics of the radio channel that vary as a function of the emission frequency, of the passband of the signal and, for digital audio broadcasting in the AM bands (DRM), also of the propagation conditions during the day and the night and solar cycles.

Receivers used for OFDM demodulation essentially use the channel response calculated from reference pilots. Therefore the accuracy of this estimate depends on the proportion of reference pilots inserted in OFDM symbols.

3. Interfering (or Jamming) Signals

Parasite signals can be added to the useful signal during a transmission between a transmitter and a receiver, and can disturb reception of the useful signal if they exceed a given threshold.

This threshold depends particularly on the characteristics of the receiver and the channel on which jamming is received, compared with the useful signal channel. Thus, we talk about "co-channel jamming" when the interfering signals and the useful signal are transported on the same channel, and "adjacent channel jamming" when the interfering signals and the useful signal are transported on adjacent channels.

For example in the AM band, the useful signal may be disturbed by pulse type jamming caused by human activities (automobile, industrial and medical equipment, lighting fixtures, etc.) and/or by narrow band jamming related to other transmissions in these AM bands (AM radio, communication systems, radar, etc.).

Note that the presence of these other transmissions prevents an increase in the power of a DRM band that would otherwise disturb neighbouring bands and for example prevent good quality reception of classical AM analogue signals. Filters used on existing receivers are not sufficient to perfectly eliminate neighbouring bands.

Several techniques for elimination, or at least for the reduction of jamming are already known to those skilled in the art.

Thus, in patent application EP 1087579 (Canceller for jamming wave by interference) K. Shibuya et al. present a technique for cancellation of jamming created by interference in a system using an OFDM type modulation.

In patent CA 1186742 (Interference cancelling system for a mobile subscriber access communications system) Frank S. Gutleber et al. also propose a system for cancellation of interference in a conventional communications system that does not use an OFDM type modulation.

A technique for measuring jamming in radar was also proposed by Bernard L. Lewis et al. in U.S. Pat. No. 5,359,329.

Finally, M. Lanoiselee et al. present a technique for cancellation of jamming in patent FR 2 753 592 ("Procédé de démodulation de signaux numériques émis par salves robuste aux brouilleurs à bande étroite—Method of demodulating digital signals emitted in bursts, resistant to narrow band jammers") based on frequency processing of jammers.

4. Disadvantages of Techniques According to Prior Art

These techniques for eliminating jammers are based on a priori knowledge of the jammers and/or the constancy of the useful signal, and therefore take place earlier than the channel estimating and/or received data equalising steps.

They usually require the identification of "peaks" located above the average of OFDM symbol pilots before the channel can be correctly estimated and data pilots can be equalised. Thus according to prior art, "peaks" located in the time domain are observed and are eliminated.

However, these solutions are complex and difficult to use for two main reasons:
    firstly, OFDM symbol data pilots are at very different levels, due to modulation at several levels (MAQ16, MAQ64, etc.);
    secondly, the channel generates very large amplitude and phase variations between pilots.

SUMMARY

An aspect of the disclosure relates to a method for receiving of a multi-carrier signal consisting of a sequence of symbols in time, each symbol comprising a plurality of carriers carrying data, at least one of the symbols comprising at least one reference pilot.

According to an embodiment of the invention, such a method includes the following steps:
    a first estimation of a propagation channel, from at least a first set of said data, according to a first estimating technique taking account of said reference pilot(s);
    at least a second estimation of said propagation channel, from said first set, according to a second estimating technique distinct from said first technique,
    comparison between said first and second estimations, outputting an error signal;
    detection of at least one interfering signal in said propagation channel, by analysis of said error signal.

An embodiment of the invention also proposes a detection technique in reception, for efficiently locating interfering signals that could affect the multicarrier signal called the useful signal, made by comparing and analysing the different propagation channel estimations.

In particular, it can be noted that the two estimations are obtained from the same current data, using distinct estimating methods.

Thus, the method according to an embodiment of the invention can be used for example to compare the channel estimation on each carrier forming a symbol (first estimation) and the estimation of the value of the channel on a carrier as a function of all the others (second estimation) to determine the position of jammers.

For example, the second channel estimation may be determined from said first estimation.

This technique for detection of interfering signals is particularly suitable for jamming in narrow band.

Advantageously, the method according to an embodiment of the invention also includes a step to correct at least one of said estimations, depending on said error signal, so as to output a corrected estimation.

An embodiment of the invention thus discloses how to determine the position of jammers from the analysis of the channel estimation, so as to act on the carriers (reference pilots and/or data pilots) affected by these jammers. The corrected estimation obtained by analysing the error signal may thus be used to equalise data carried by carriers of the multicarrier signal, which therefore improves decoding of data.

Preferably, the error signal has at least one error peak corresponding to an interfering signal, and the correction step is implemented for at least one of said error peaks.

Thus, the position of interfering signals is determined from peaks observed in the error signal. Knowing the position of the interfering signals, data pilots affected by these signals can then be corrected.

Advantageously, the error correction step is used for at least one error peak greater than a first predetermined threshold.

Thus, only significant disturbances affecting the multicarrier signal are eliminated, or at least reduced.

For example, for carrier frequencies normalised to 1, it can be considered that the error correction step is implemented when the first predetermined threshold is between 0.01 and 0.03.

According to a first variant embodiment, the correction step implements a reduction of a confidence value associated with at least one of said carriers of the multicarrier signal, which are close to at least one of said error peaks in the time/frequency domain.

Therefore, this is a soft decision.

In particular, a confidence value may be reduced for confidence values associated with the N carriers before and/or the N carriers after a carrier located at the position of one of said error peaks, in time and/or in frequency.

This reduces the confidence assigned to the channel estimation on a region around detected error peaks, by reducing the confidence value associated with carriers located at positions corresponding to (or close to) the positions of error peaks.

For example, N could be chosen to be equal to 2. This would then reduce the confidence value associated with the two carriers before and the two carriers after the carrier located at the time/frequency position of an error peak.

According to a second variant embodiment, the correction step implements an elimination of at least one of said carriers of the multicarrier signal, which are close to at least one of said error peaks in the time/frequency domain.

This is then a hard decision.

According to this variant embodiment, the data associated with the carriers affected by the interfering signal(s) are set to zero (in other words, the confidence value associated with carriers located at positions corresponding to (or close to) the positions of error peaks are set to zero). This thus eliminates data pilots and/or reference pilots affected by jammers.

As proposed for the first variant embodiment, it is also possible to set carriers to zero in an entire region around the corresponding detected error peaks.

Preferably, the correction step only acts on a predetermined maximum number M of error peaks at a given instant, obviously to prevent complete loss of data in the case of a very disturbed channel.

A maximum number M of 7 or 8 error peaks is usually chosen in the case of a DRM type transmission system with 210 carriers.

Thus, if N is chosen to be equal to 2 and M equal to 7 in a DRM type transmission system with 210 carriers, the correction step implements a reduction in the confidence value associated with the 35 carriers which are close to the 7 error peaks greater than a predetermined threshold in the time/frequency domain.

Thus, limiting the number of possible corrections avoids an excessive degradation of intrinsic performances of the system related to "holes" introduced by the reduction (or even setting to zero) of confidence values associated with carriers of the multicarrier signal, which are close to at least one error peak in the time/frequency domain.

Advantageously, the reception method according to an embodiment of the invention also comprises a step to smooth the error signal before the correction step.

In particular, this smoothing step may implement at least one recursive filter.

Thus, this smoothing can limit false detections.

This reception method is also remarkable in that said first estimating technique implements a step of interpolation in time and/or in frequency, from said reference pilots.

The result obtained is thus an estimation of the propagation channel response that may be more or less relevant depending on the number of reference pilots and their distribution in the time/frequency domain.

Preferably, the second estimating technique is a successive approximation time and/or frequency estimation using an adaptive filtering step.

Thus, a linear prediction on the channel estimate is made taking account of previous events to determine future events.

In particular, this filtering step may use a stochastic gradient type algorithm.

Such an algorithm, also called LMS (Least Mean Square), can be used for example to calculate adaptive filter coefficients.

This algorithm is suitable for an embodiment of the invention because it is stable and does not include a large number of operations.

Advantageously, the reception method according to an embodiment of the invention also comprises at least one of the following steps:
  equalisation of data as a function of said corrected estimation;
  channel decoding as a function of said corrected estimation;
  calculating the pulse response of said propagation channel as a function of said error signal and said first and/or second estimations and/or said corrected estimation.

Thus for example, in order to calculate the pulse response, the channel response may be replaced by a new estimation of the channel response, or the corrected estimation.

According to other variant embodiments, it can be seen that the calculation of the pulse response at a given time/frequency position depends on the first estimation when the value of the error signal is lower than a second predetermined threshold, and it depends on the second estimation when the value of the error signal is greater than or equal to the second predetermined threshold.

Preferably, the multicarrier signal is modulated using an OFDM type multicarrier modulation.

In particular, the multicarrier signal may be of the DRM type.

In particular, such an OFDM modulation can be used to resist strong disturbances due particularly to reflections on ionospheric layers generating echoes and the Doppler effect that occur in AM frequency bands.

Thus, OFDM modulation is increasingly used in digital broadcasting systems because it is very suitable for variations in the radio channel. An embodiment of the invention then proposes to reduce the influence of a narrow band co-channel jammer (analogue signal) on an OFDM signal.

An embodiment of the invention also relates to a device for the reception of a corresponding multicarrier signal.

According to an embodiment of the invention, such a device comprises:
  first means of estimating a propagation channel from at least one first set of said data, outputting a first estimation of said propagation channel according to a first estimating technique taking account of the reference pilot(s);
  second means of estimating said propagation channel from said first set, outputting a second estimation of said propagation channel according to a second estimating technique, distinct from said first technique;
  means of comparison of said first and second estimations, outputting an error signal; and
  means of detecting at least one interfering signal in said propagation channel by analysis of said error signal.

BRIEF DESCRIPTION OF THE DRAWINGS

Other specific features and advantages of one or more embodiments of the invention will appear more clearly after reading the following description of a preferred embodiment given as a simple illustrative and non-limitative example and the appended figures, wherein.

DETAILED DESCRIPTION OF ILLUSTRATIVE EMBODIMENTS

Figure 1:
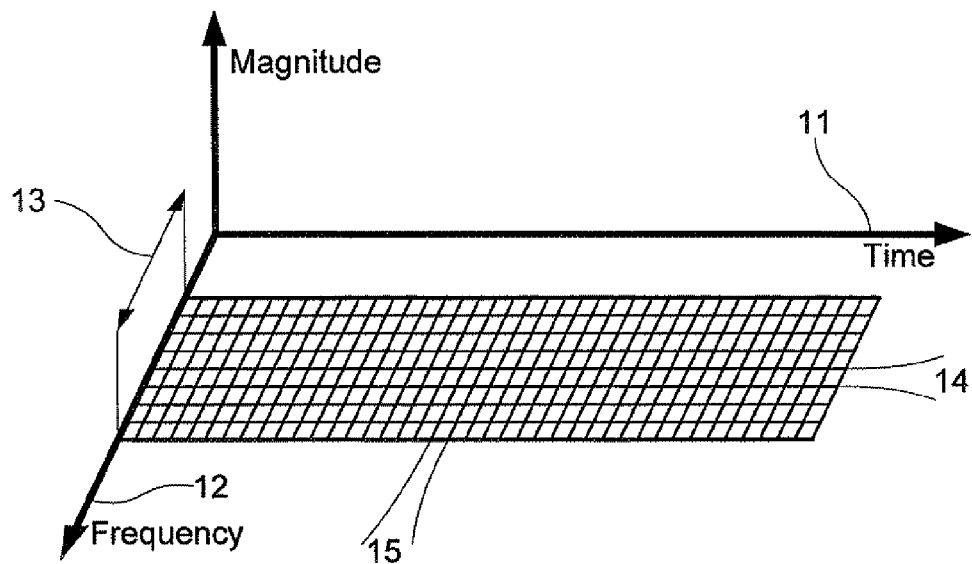
FIGS. 1 and 2, already described in the preamble, illustrate the general principle of OFDM modulation using a time/frequency representation of an OFDM channel.
Figure 2:
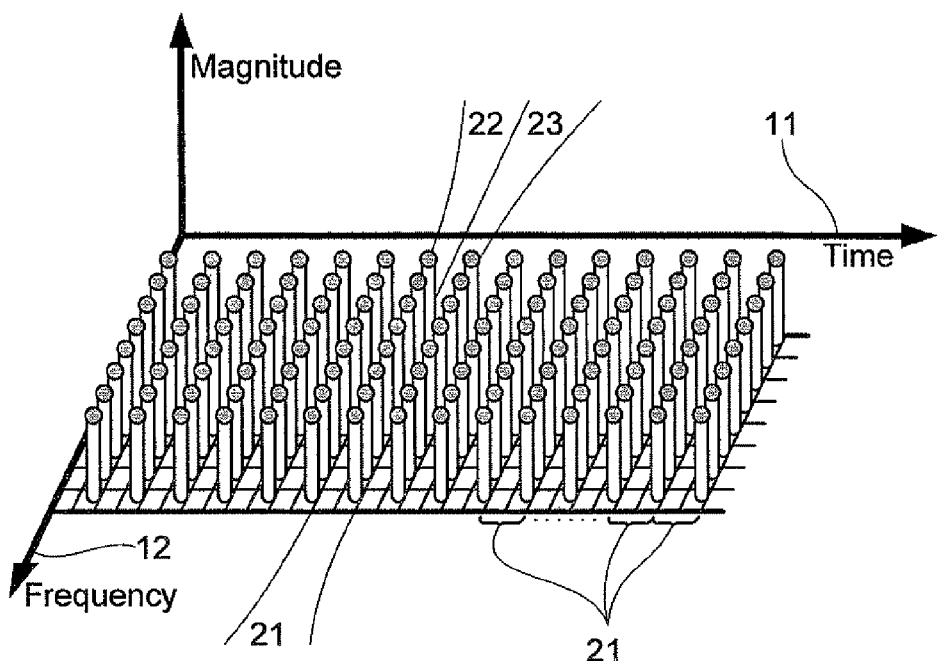
Figure 3:
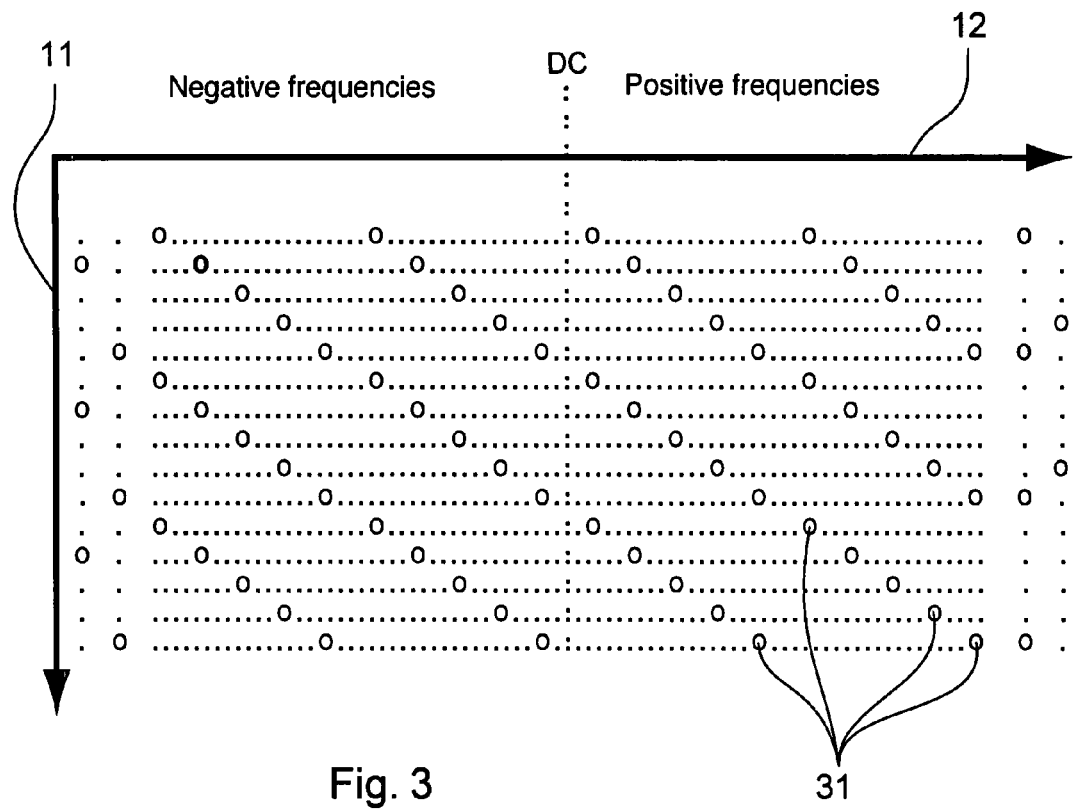
FIGS. 3 and 4, also described in the preamble, present two examples of an OFDM structure: for a set of DRM symbols in mode A (FIG. 3) and for a set of DVB-T symbols (FIG. 4)
Figure 4:
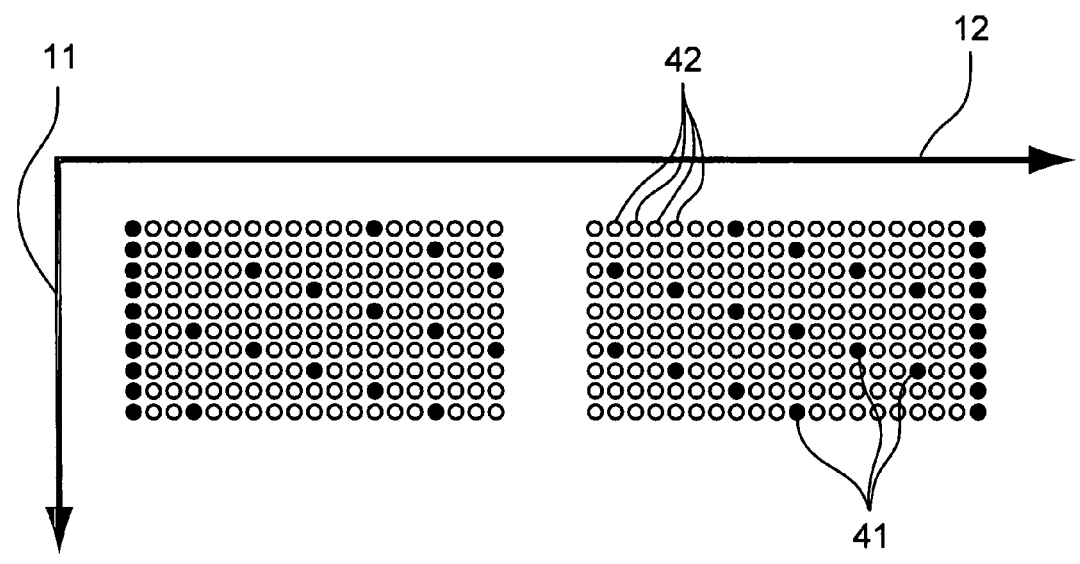

Thus, the general principle of an embodiment of the invention is based on a technique for detection of interfering signals (also called jammers) in the data channel using at least two successive estimations of the propagation channel and a technique for correction of multicarrier signal data affected by interfering signals.

Therefore, an embodiment of the invention is aimed at reducing at a receiver degradation introduced by co-channel jammers, particularly narrow band jammers, on a multicarrier data transmission signal, particularly for channels with strong variations in time and in frequency, once these jammers have been detected.

More precisely, according to one preferred embodiment, an OFDM type multicarrier signal and transmission in AM bands are considered.

The reception method according to an embodiment of the invention proposes to use the following steps to detect pilots affected by one or more jammers and to correct the channel estimation:

estimation of the propagation channel by interpolation of reference pilots in frequency and in time (first estimating technique);

linear prediction on the channel estimation along the frequency axis, starting from the first channel estimation (second channel estimating technique), for example using adaptive filters;

determine an error signal along this frequency axis by comparing the first and second estimations of the propagation channel.

These different steps are done on several consecutive OFDM symbols (estimation by successive approximation). Thus, variations in jammers can be monitored at the same rate as OFDM symbols.

In order to limit parasite detections, the error signal with two dimensions (time/frequency) thus obtained is then filtered along the time axis by a low pass smoothing filter. The result is that the largest error peaks in the error signal are thus determined for each corresponding OFDM symbol, by comparing them with a first threshold. These peaks correspond to interfering signals, also called parasite or jamming signals, on the multicarrier data signal.

For example, this first threshold is chosen to be equal to 0.03 for carriers normalised to 1. For the M peaks higher than this first threshold (for example M=7), the confidence assigned to the channel estimate on a region around these M peaks is reduced.

More precisely, in order to reduce this confidence, an embodiment of the invention proposes either to reduce the value of the confidence associated with each carrier, obtained in the previous decoding step ("soft" type decoding) or to set the value of the confidence associated with each carrier to zero, in other words to set data associated with the carriers considered to zero ("hard" type decoding).

Thus, the regions around the carriers corresponding to an error peak in the time/frequency domain, and therefore the carriers affected by the interfering signals, are processed in a binary manner ("hard" type decoding) or in a smoothed manner ("soft" type decoding).

Due to these cancellations or attenuations of carriers by at least 10 dB, the response of the propagation channel is strongly reduced at the time/frequency positions corresponding to these corrected carriers.

According to an embodiment of the invention, the channel response can also be replaced by the new channel response estimation for the calculation of the pulse response.

Figure 5:
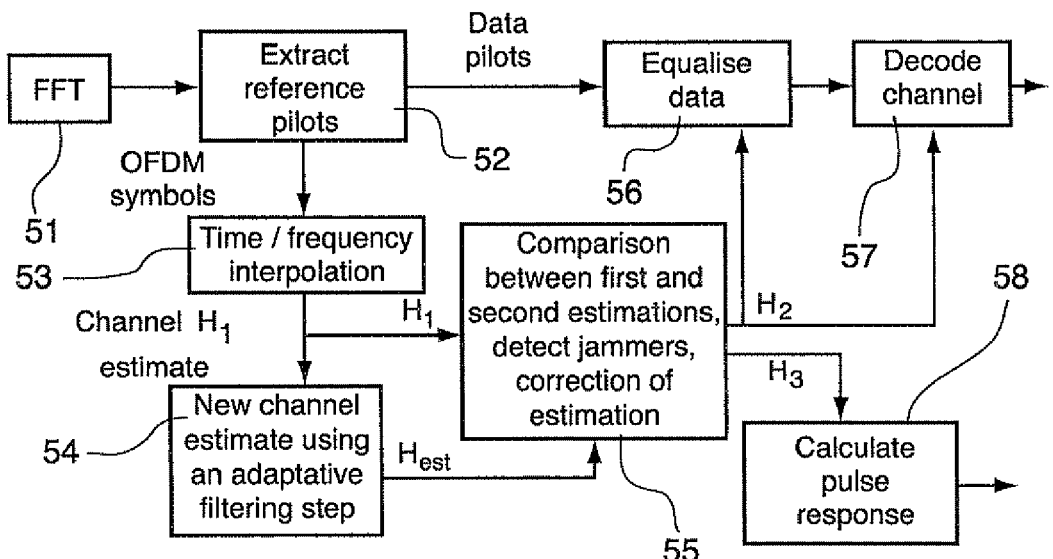
FIG. 5 presents the general principle of the invention, using a block diagram.

We will now present a functional description of the reception technique according to this preferred embodiment of the invention using an OFDM type modulation in a DRM transmission system, with reference to FIG. 5.

As described above, interfering signals are detected by comparison between a first estimation of the propagation channel made using reference pilots and a second estimation of the value of the channel on a carrier as a function of all the others (time and/or frequency estimation by successive approximation).

At the receiver, a first Fast Fourier Transform (FFT) step 51 is used to retrieve OFDM symbols from the data transmission multicarrier signal.

Since the receiver knows the time/frequency position of the reference pilots, it can thus extract reference pilots from the data signal during a step reference 52.

These reference pilots inserted in the multicarrier signal are used to estimate the propagation channel. Thus, once "coarse" time and/or frequency synchronisations have been determined, a first channel estimation can be obtained by interpolation between reference pilots in time and/or in frequency (step 53). The result obtained is a first estimation of the propagation channel (corresponding to the channel response) denoted $H_1$, taking account of the reference pilot(s).

According to an embodiment of the invention, a second technique for making a time and/or frequency estimation of the propagation channel by successive approximation, distinct from the first estimating technique, is then used during a step reference 54. More precisely, a prediction algorithm based on adaptive filters is applied at each point of the channel response corresponding to each OFDM symbol carrier. Thus, a linear prediction is made on the channel estimation. This step 54 outputs a new estimation of the propagation channel denoted $H_{est}$.

According to this preferred embodiment of the invention, the adaptive filter coefficients are calculated from a stochastic gradient type algorithm (also called LMS for "Least Mean Square"), so as to determine an estimation of the value of the channel as a function of other carriers.

This new channel estimation usually includes an estimating sub-step in the time domain (subscript n) followed by an estimating sub-step in the frequency domain (subscript m). Note that an estimation in the frequency domain is sufficient to detect narrow band jammers, but it is more difficult to obtain because the signal is limited in frequency.

The first estimation $H_1$ and the second estimation $H_{est}$ are then compared during a jammer detection step 55, outputting an error signal.

More precisely, during step 55, the error between the first estimation $H_1$ and the second estimation $H_{est}$ is determined in each cell in the time/frequency domain (n, m) where n is a time subscript and m is a frequency subscript:

$$S_e(n,m)=h_1(n,m)-h_{est}(n,m),$$

where: $h_1(n,m)$ is the value of the first channel estimation for cell (n,m);

$h_{est}(n,m)$ is the value of the second channel estimation for cell (n,m);

$S_e(n,m)$ is the error between the two channel estimations at the point with coordinates (n,m).

This error signal $S_e$ is then smoothed (namely slightly filtered), also during step 55, for example using a first order recursive filter, so as to minimise parasite detections and thus make the error signal more reliable.

The result is thus a smoothed error signal $\tilde{S}_e(n,m)$ for each cell (n,m) defined by:

$$\tilde{S}_e(n,m)=\alpha*\tilde{S}_e(n-1,m)+(1-\alpha)*S_e(n,m), \text{ for example in which } \alpha=0.95.$$

If the difference between the two estimates $H_1$ and $H_{est}$ is greater than a predetermined threshold, in other words if the smoothed error signal comprises a peak greater than a first predetermined threshold Ψ, then there is a narrow band jammer present at the point with coordinates (n,m).

Thus, the time/frequency position of a jammer in the propagation channel can be detected. Once this position has been determined, it is decided to strongly attenuate the confidence value associated with the estimation of the propagation channel at this time/frequency position, still in step 55.

More precisely, in general a jammer is not precisely superposed with one carrier of an OFDM symbol, therefore a disturbance is introduced on several OFDM carriers and it is decided to attenuate the confidence value associated with the estimation of the propagation channel in a region around the time/frequency position of the interfering signal.

Thus, every time that a jammer is detected, in other words every time that the smoothed error signal $\tilde{S}_e(n,m)$ is greater than the first predetermined threshold Ψ (for example Ψ=0.03 for carriers normalised to 1), several OFDM carriers are attenuated around the detection (for example two before and two after).

Thus:

If $\tilde{S}_e(n,m)<\Psi$ then $h_2(n,m)=h_1(n,m)$

If $\tilde{S}_e(n,m)\geq\Psi$ then $h_2(n,m+i)=\text{att}*h_1(n,m+i)$ $i \in [-2,2]$ where: Ψ is the limiting threshold for detection of the presence of a jammer;

$h_2(n,m)$ is the new value of the channel response at the point with coordinates (n,m), also called corrected estimation;

Att is the attenuation undergone by the OFDM carrier affected by a jammer (for example Att>10 dB).

It can be noted that there are two possible types of decoding: either a "soft" type decoding can be done in which the confidence values associated with each carrier are reduced, or a "hard" type decoding that consists of setting the carriers affected by jammers to zero.

Thus, the number of possible corrections must be limited so as to prevent excessive degradation of the intrinsic performances of the system related to attenuation of an excessive number of carriers of OFDM symbols.

In this particular embodiment applied to a DRM type signal in the AM band, it is preferable to limit the number of error peaks to a maximum of 7 or 8 peaks larger than a first predetermined threshold. For example, this first threshold may be chosen to be equal to 0.03 for carriers normalised to 1.

Thus, if we restrict the operation to the seven largest error peaks (M=7), and we choose to reduce the confidence value associated with the two carriers before and the two carriers after a carrier located at the position of error peaks (N=2), then a maximum of 35 carriers are attenuated.

Finally, the result at the output from the jammer detection step 55 is to obtain a propagation channel estimate $h_2(n,m)$ equal to the first channel estimate $h_1(n,m)$ if the carrier located at the position (n,m) is not affected by an interfering signal, and is otherwise corrected.

This corrected estimation $h_2(n,m)$ will be used particularly to equalise data during a step 56, and to decode the channel during a step 57. Equalisation of data and channel decoding are thus improved.

The first estimation of the propagation channel $h_1(n,m)$ or the second estimation of the propagation channel $h_{est}(n,m)$ can be used to calculate the pulse response during the step reference 58. Thus the propagation channel estimate used to calculate the pulse response denoted $h_3(n,m)$ is defined by:

$$h_3(n,m) = \begin{cases} h_1(n,m) & \text{if } \tilde{S}_e(n,m) < \text{threshold} \\ h_{est}(n,m) & \text{if } \tilde{S}_e(n,m) \geq \text{threshold} \end{cases}$$

Once calculated, the pulse response is used to determined a finer frequency synchronisation.

Thus, the synchronisation of the receiver can be improved by improving the reliability of the pulse response calculation.

Thus, the technique according to an embodiment of the invention can be used to detect jammers in the data channel, using firstly a classical estimating technique by interpolation of reference pilots known to the receiver in time and in frequency, and secondly an estimate by successive approximation. Performances of the reception system can be improved in this way by using a correction of the propagation channel estimate, to give a better time and/or frequency synchronisation.

Figure 6:
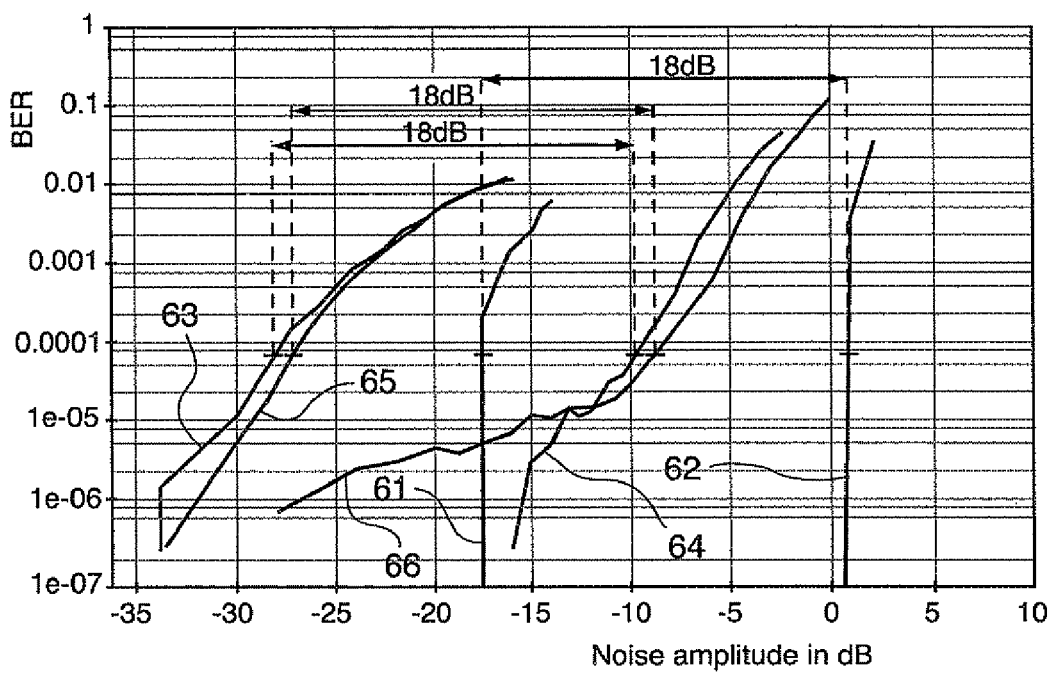
FIG. 6 describes the compared performances of different systems with or without the use of a detection and cancellation of jammers algorithm according to the invention, for different channel types.

We will now present a comparison between the performances of different systems with or without using the jammer cancellation algorithm according to an embodiment of the invention for different types of channels, with reference to FIG. 6.

These result curves are obtained using a digital radio simulation system (DRM) in AM bands.

As mentioned above, in this preferred embodiment, the OFDM type multicarrier signal is disturbed by at least one jammer, for example a narrow band jammer.

Thus in the simulation, a pure carrier type jammer is inserted for which the amplitude and frequency are varied to simulate an AM broadcast, on the multicarrier data signal.

In this simulation example, the selected DRM transmission mode corresponds to a short wave transmission, in other words in mode B (about 210 carriers in 10 kHz). The cells are modulated using a 64 QAM modulation with a coding efficiency of 0.6 (which is the most frequently used in international transmissions at the moment). The signal passband is 10 kHz and the audio throughput is about 21 kbits/s.

The jammer is a pure carrier at 200 Hz from the DRM central frequency.

The tests are carried out with different propagation channels, like those described in the DRM standard (ETSI ES 201 980).

Thus on FIG. 6:

curve 61 illustrates the bit error rate (BER) as a function of the noise amplitude in dB for channel No. 1 (a single path), as defined in the DRM standard, without using the reception technique according to an embodiment of the invention;

curve 62 illustrates the BER as a function of the noise amplitude in dB for channel No. 1, using the reception technique according to an embodiment of the invention;

curve 63 illustrates the BER as a function of the noise amplitude in dB for the channel No. 3 (four paths affected by a Doppler effect), without using the reception technique according to an embodiment of the invention;

curve 64 illustrates the BER as a function of the noise amplitude in dB for channel No. 3, using the reception technique according to an embodiment of the invention;

curve 65 illustrates the BER as a function of the noise amplitude in dB for channel No. 5 (two paths with the same power affected by a Doppler effect), without using the reception technique according to an embodiment of curve 66 illustrate the BER as a function of the noise amplitude in dB for channel No. 5, using the reception technique according to an embodiment of the invention.

Note that channel No. 3 (four paths affected by a Doppler effect) is defined in the DRM standard as follows:

| Channel No. 3: US Consortium | Good typical/moderate bad | | HF MF |
|---|---|---|---|
| | path 1 | path 2 | path 3 | path 4 |
| Delay ($\Delta_k$) | 0 | 0.7 ms | 1.5 ms | 2.2 ms |
| Path gain, RMS ($\rho_k$) | 1 | 0.7 | 0.5 | 0.25 |
| Doppler shift ($D_{sh}$) | 0.1 Hz | 0.2 Hz | 0.5 Hz | 1.0 Hz |
| Doppler spread ($D_{sp}$) | 0.1 Hz | 0.5 Hz | 1.0 Hz | 2.0 Hz | and that channel No. 5 (two paths with the same power affected by a Doppler effect) is defined as follows:

| Channel No. 5 | Good typical/moderate bad | | HF |
|---|---|---|---|
| | path 1 | path 2 | path 3 | path 4 |
| Delay ($\Delta_k$) | 0 | 4 ms | | |
| Path gain, RMS ($\rho_k$) | 1 | 1 | | |
| Doppler shift ($D_{sh}$) | 0 | 0 | | |
| Doppler spread ($D_{sp}$) | 2 Hz | 2 Hz | | |

The performances of the reception technique according to an embodiment of the invention presented in FIG. 6 can be used to evaluate the gain provided by this technique.

It can be seen that for a bit error rate equal to $10^{-4}$ (criterion selected by the DRM consortium), the gain between performances obtained without the jammer cancellation algorithm and performances obtained with the jammer cancellation algorithm is of the order of 18 dB, regardless of the propagation channel.

Other simulations have also been made for different jammer frequency positions. The results for a BER equal to $10^{-4}$ are given in the following table:

| Jammer position | | | | | | | | | | | |
|---|---|---|---|---|---|---|---|---|---|---|---|
| −3200 Hz | | | −200 Hz | | | 10 Hz | | | 3200 Hz | | |
| Channel No. | | | | | | | | | | | |
| 1 | 3 | 5 | 1 | 3 | 5 | 1 | 3 | 5 | 1 | 3 | 5 |
| Gain in dB | | | | | | | | | | | |
| 8 | 6 | 7 | 8 | 7 | 7 | 13 | 11 | 11 | 8 | 18 | 16 |

Thus, the gain provided by the reception technique according to an embodiment of the invention is significant, even for channels with large fluctuations encountered for example in short waves.

This solution requires no (or few) modifications to input stages of the data decoder and of the HF head (for high frequency) of the receiver. Therefore it is easy and inexpensive to implement.

Obviously, this invention is not restricted to the embodiments described in detail herein as examples, but on the contrary it includes all modifications that could be made by those skilled in the art without departing from the scope of the invention.

Note also that embodiments of the invention is not restricted to a purely hardware implementation but it could also be used in the form of a sequence of instructions for a computer program or in any form combining a hardware part and a software part. If an embodiment of the invention is partially or fully implemented in software form, the corresponding instruction sequence could be stored in a removable storage means (for example on a diskette, a CD-ROM or a DVD-ROM) or in a fixed storage means, this storage means being partially or fully readable by a computer or a microprocessor.

An embodiment of the disclosure provides a technique for simply and efficiently detecting one or more interfering signals affecting a multicarrier data transmission signal, for example of the OFDM type.

In particular, an embodiment of the disclosure reduces degradation added by co-channel jammers on a useful signal, notably for propagation channels with strong time and/or frequency variations.

An embodiment proposes such a technique for improving data reception and decoding performances at a receiver.

An embodiment provides such a technique for improving the estimation of the propagation channel of such multicarrier signals, and refining the synchronisation of receivers.

Yet another embodiment proposes such a technique that is easy to implement, while remaining at reasonable cost.

Although the present disclosure has been described with reference to one or more embodiments, workers skilled in the art will recognize that changes may be made in form and detail without departing from the spirit and scope of the disclosure and/or the appended claims.

The invention claimed is:

1. Method for receiving a multicarrier signal comprising a sequence of symbols in time, each symbol comprising a plurality of carriers carrying data, at least one of the symbols comprising at least one reference pilot, wherein the method includes the following steps:
   a first estimation of a propagation channel by a receiver device, from at least a first set of said data, according to a first estimating technique taking account of said at least one reference pilot;
   at least a second estimation of said propagation channel by the receiver device, from said first set, according to a second estimating technique distinct from said first estimation technique;
   comparison between said first and second estimations, outputting an error signal;
   detection of at least one interfering signal in said propagation channel, by analysis of said error signal; and
   correcting at least one of said first or second estimations depending on said error signal, so as to output a corrected estimation, wherein said error signal has at least one error peak corresponding to the at least one interfering signal, and wherein the step of correcting is implemented for at least one of said error peaks and implements a reduction of a confidence value associated with at least one of said plurality of carriers of the multicarrier signal, which are close to at least one of said error peaks in the time/frequency domain.

2. Reception method according to claim 1, wherein said correction step is implemented for at least one error peak greater than a first predetermined threshold.

3. Reception method according to claim 2, wherein said first predetermined threshold is between 0.01 and 0.03 for carrier frequencies normalized to 1.

4. Reception method according to claim 1, wherein the confidence value is reduced for confidence values associated with N carriers before and/or N carriers after a carrier located at the position of one of said error peaks, in time and/or in frequency, wherein N is an integer.

5. Reception method according to claim 4, wherein N is chosen to be equal to 2.

6. Reception method according to claim 1, wherein said correction step implements an elimination of at least one of said carriers of the corresponding multicarrier signal, which are close to at least one of said error peaks in the time/frequency domain.

7. Reception method according to claim 1, wherein said correction step only acts on a predetermined maximum number M of error peaks at a given instant, wherein M is an integer.

8. Reception method according to claim 7, wherein M is set equal to 7 or 8.

9. Reception method according to claim 1, wherein the method also comprises a step to smooth said error signal before said correction step.

10. Reception method according to claim 9, wherein said smoothing step implements at least one recursive filter.

11. Reception method according to set forth in claim 1, wherein said first estimating technique uses a step of interpolation in time and/or in frequency, from said at least reference pilot.

12. Reception method according to set forth in claim 1, wherein said second estimating technique is a successive approximation time and/or frequency estimation using an adaptive filtering step.

13. Reception method according to set forth in claim 12, wherein said adaptive filtering step comprises a stochastic gradient type algorithm.

14. Reception method set forth in claim 1, wherein the method also comprises at least one of the following steps:
equalisation of data as a function of said corrected estimation;
channel decoding as a function of said corrected estimation;
calculating the pulse response of said propagation channel as a function of said error signal and said first and/or second estimations and/or said corrected estimation.

15. Reception method according to claim 14, wherein said step of calculating the pulse response at a given time/frequency position depends on the first estimation when the value of the error signal is lower than a second predetermined threshold, and it depends on the second estimation when the value of the error signal is greater than or equal to the second predetermined threshold.

16. Reception method according to claim 1, wherein said multicarrier signal is of an Orthogonal Frequency Division Multiplex (OFDM) type.

17. Reception method according to claim 16, wherein said multicarrier signal is of Digital Radio Mondiale (DRM) type.

18. Device for the reception of a multicarrier signal comprising a sequence of symbols in time, each symbol comprising a plurality of carriers carrying data, at least one of the symbols comprising at least one reference pilot, wherein the device comprises:
a first channel estimator, which estimates a propagation channel from at least one first set of said data, outputting a first estimation of said propagation channel according to a first estimating technique taking account of said at least one reference pilot;
a second channel estimator, which estimates said propagation channel from said first set, outputting a second estimation of said propagation channel according to a second estimating technique, distinct from said first estimation technique;
a comparator, which compares said first and second estimations, outputting an error signal; and
a detector, which detects at least one interfering signal in said propagation channel by analysis of said error signal and is configured to correct at least one of said first or second estimations depending on said error signal, so as to output a corrected estimation, wherein said error signal has at least one error peak corresponding to the at least one interfering signal, and wherein correction is implemented for at least one of said error peaks and implements a reduction of a confidence value associated with at least one of said plurality of carriers of the multicarrier signal, which are close to at least one of said error peaks in the time/frequency domain.

19. Method for receiving a multicarrier signal comprising a sequence of symbols in time, each symbol comprising a plurality of carriers carrying data, at least one of the symbols comprising at least one reference pilot, wherein the method includes the following steps:
a first estimation of a propagation channel by a receiver device, from at least a first set of said data, according to a first estimating technique taking account of said at least one reference pilot;
at least a second estimation of said propagation channel by the receiver device, from said first set, according to a second estimating technique distinct from said first estimation technique;
comparison between said first and second estimations, outputting an error signal;
detection of at least one interfering signal in said propagation channel, by analysis of said error signal;
correcting at least one of said first or second estimations depending on said error signal, so as to output a corrected estimation; and
smoothing said error signal before said correction step by implementing at least one recursive filter.

* * * * *